Nov. 18, 1941.  W. P. SHEPHERD  2,263,194
DISPLAY STAND AND HUMIDIFIER FOR PERISHABLE PRODUCTS
Filed May 24, 1939   2 Sheets-Sheet 1
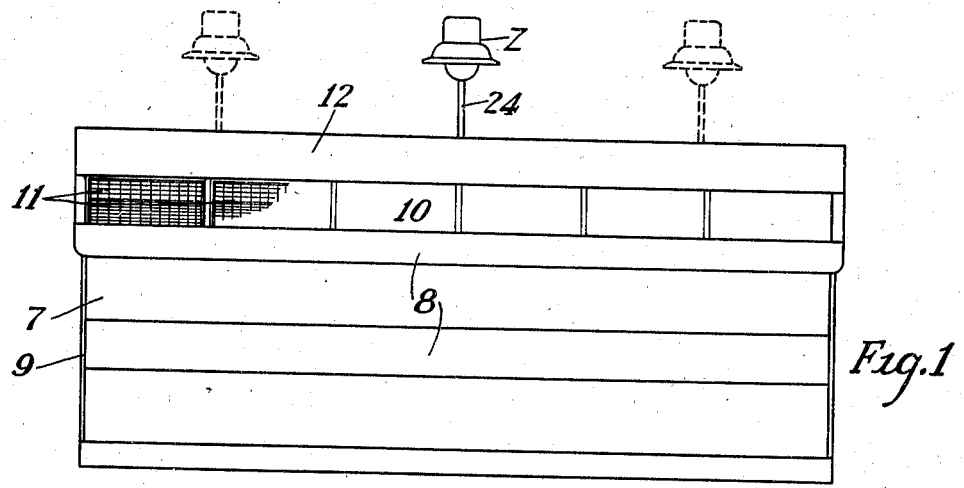
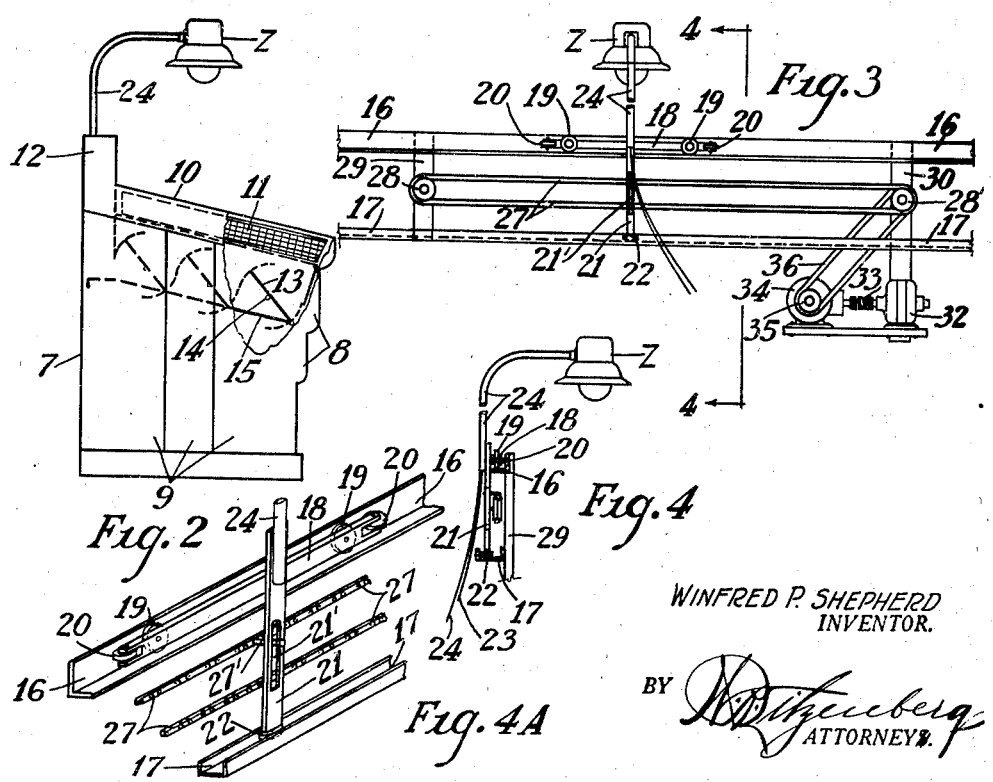
WINFRED P. SHEPHERD
INVENTOR.

Nov. 18, 1941.   W. P. SHEPHERD   2,263,194
DISPLAY STAND AND HUMIDIFIER FOR PERISHABLE PRODUCTS
Filed May 24, 1939   2 Sheets-Sheet 2
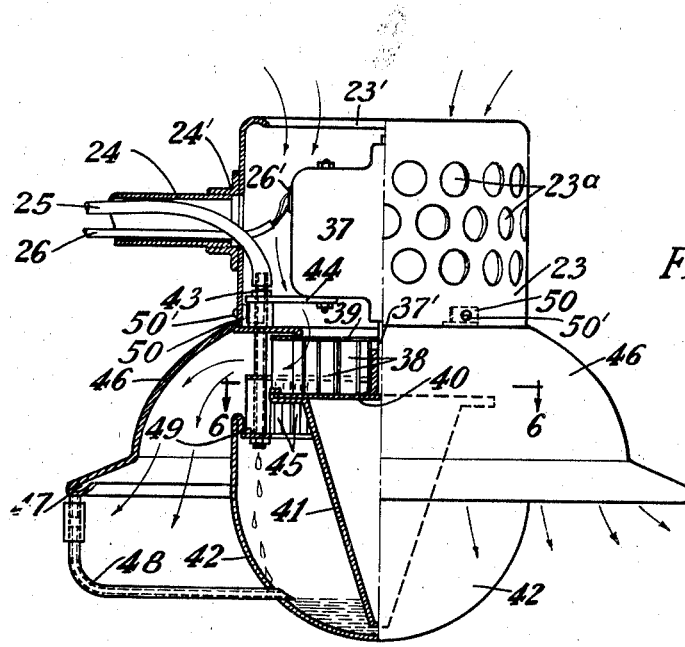
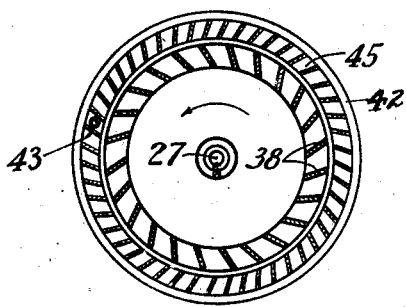
WINFRED P. SHEPHERD
INVENTOR.

Patented Nov. 18, 1941

2,263,194

UNITED STATES PATENT OFFICE 2,263,194

DISPLAY STAND AND HUMIDIFIER FOR PERISHABLE PRODUCTS

Winfred P. Shepherd, Pasadena, Calif.

Application May 24, 1939, Serial No. 275,349

6 Claims. (Cl. 261—30)

My invention relates to display stands for perishable products, such as fruits, vegetables, flowers and the like, which it is desired to have artistically displayed for public view, and more particularly to such a display stand with means for causing a very fine mist of moisture to be produced over and upon said products, it being the particular object of the invention to supply an amount of moisture in the form of fog or a very fine mist which shall be proportionate to the natural evaporation of moisture from such products.

Where a spray is produced by the pressure of the water supply, any amount of water sufficient to produce such spray is greater than is desirable. It is known that an excess of moisture on vegetables, or other produce, often results in a bacterial growth in the form of slime, which lessens the marketability of such produce. Sometimes an excess of moisture causes accelerated growth of soil fungi on the produce.

It is the object of my invention to obtain the desired supply of moisture in the form of a mist or fog, regulable in the amount to equalize the amount of moisture that would evaporate from the produce on display if such mist or fog were not present. This is accomplished by a mechanical means which is not related to the pressure of the water supply. It is apparent that I could use other mechanical means than that shown in my drawings, such as compressed air, to produce a mist or fog of the required density.

In order to explain my invention, I have shown on the accompanying two sheets of drawings, one practical embodiment thereof, which I will now describe. In the drawings:

Figure 1 is a front elevation of a display stand embodying my invention;

Figure 2 is an end view thereof, with parts broken away;

Figure 3 is a rear view of the means for supporting and moving the mist forming mechanism;

Figure 4 is an edge view thereof, taken on line 4—4 of Fig. 3;

Figure 4—A is an enlarged detail of the mechanism for moving the mist forming mechanism;

Figure 5 is an enlarged, vertical sectional view through my new mist forming apparatus, partly in elevation; and Figure 6 is a horizontal sectional view taken on the line 6—6, of Fig. 5.

Referring now more in detail to the drawings, my improved display stand may be of any desired or architectural design, but here I have shown a general box structure 7, having modernized front 8, and ends, as 9, with the top 10, arranged for trays or baskets, as 11, for the products, and in the form shown in Figs. 1 and 2, with an upper back portion, designated 12, and extended from end to end of the stand, as clearly indicated.

In the structure, under the display trays or baskets, I have shown a series of louvers, as 13, pivoted in their middles, at 14, 14, and all connected by an operating rod 15, whereby said louvers can be moved on their pivots, as indicated by the broken lines, to open and close circulating space under said trays or baskets.

In and along the back member 12, is mechanism for supporting and moving the mist forming apparatus. The fixed supporting members include an upper angle member 16 and a lower channel member 17, running the length of the stand and fastened to upright supporting members 29 and 30. Members 16 and 17 together form a track or runway along which the movable member travels. The moving mechanism consists of a carriage having a horizontal channel member 18, with wheels 19, 19, at its opposite ends, as seen in Fig. 4—A, running on the horizontal flange of the angle member 16, and two other wheels 20, 20, at right angles to the first wheels, to bear against the vertical flange of said angle member 16. Welded to channel member 18 and at right angles thereto is a vertical slotted member 21, to the lower end of which is attached a wheel 22, running in a horizontal position in the channel member 17. This wheel 22, running in channel member 17, serves to keep the member 21 in vertical alignment as the carriage moves along the trackway.

The mist forming apparatus, designated as a whole Z, is carried on a bent support or conduit 24, which is fastened to the vertical carriage member 21, and supports said mist forming apparatus Z by means of a flange attached to the housing 23. The support 24, preferably of tubular form, carries therein water supply hose 25 and electric wires 26, as seen more clearly in Fig. 5.

An endless chain 27 operates around two pulleys or sprockets, as at 28, 28', on upright supporting members 29 and 30, between the angle member 16 and the channel member 17, said chain having a single attachment link with a pin projecting therefrom and operating in the slot 21' in vertical member 21, as clearly seen in Fig. 4—A. A motor 32, Fig. 3, connected by means of a flexible joint or connection at 33, drives a worm and gear in case 34, with drive pulley 35 and endless belt 36 to pulley 28' at the right hand end of Fig. 3, which pulley is of the double structure, well known in the art.

Referring now to Figs. 5 and 6, I will describe my new mist forming apparatus which makes possible the efficient operation of the invention here shown and described.

A motor 37, is supported in the top part of the case or housing 23, which is shown open at the top, as at 23', or it may be closed and the housing provided with air holes, indicated as 23a, on said Fig. 5. Said housing 23 is secured to the hood portion or member 46 by means of angle clips 50 and screws 50'. The electric wires 26 are connected with said motor, as at 26'. The shaft 37' of said motor carries a fan structure 38, open in its center, as indicated in Fig. 6, and having a top ring 39, while the bottom 40 is in the form of a bottom disc, as indicated in said Fig. 5. Said bottom member 40 has attached thereto, to turn therewith, a conical member 41, dipping down into the water bowl 42, slowly supplied with water from the water hose 25, and the tubular connection at 43. The usual valve would control the water supply through said hose. A brace member 44, of which there are three, supports the motor case within the housing.

The water in the bottom of the bowl or reservoir 42 comes in contact with the lower end of the cone 41 and adheres to its surface. The rapid rotation of the cone causes the water to flow up its surface through the combined action of the force of adhesion and the centrifugal force of rotation, thus causing a progressively thinner film of water to rise and finally to fly off the outer edge of the disc at the top of the conical member 41, in the form of a thin layer of finely divided particles of water.

Resting on an inner annular flange 49 of the bowl 42 is a stationary ring of small plates or baffle members 45, so arranged with relation to one another that each is approximately normal to the direction of the water particles thrown off the outer edge of the rotating cone 41. The inner edge of each such baffle overlaps the outer edge of the adjoining baffle, in such line of travel of the water particles. Such particles of water impinging upon the faces of the baffles 45, are further broken up into a very fine mist, which is carried by the current of air produced by the fan 38, outwardly and downwardly under the hood portion 46 of said mist forming member Z. The mist or vapor which strikes the metal surface 46 is condensed into drops of water which would be detrimental to the proper functioning of the device if allowed to drop onto the produce on display in the stand. Said hood portion 46 is provided with a small annular gutter 47 around its lower inner edge to receive such condensation. A drain tube 48, connected to the gutter 47 conducts such condensation back to the water reservoir 42, as indicated in Fig. 5.

The air flow through the mist forming member Z, as indicated by the arrows in Fig. 5, is downwardly past the motor, through the fan and then outwardly and downwardly in a cone-shaped volume of vapor. The vapor thus directed down upon the produce on the stand, is distributed over the entire area as said mist forming member Z is moved slowly back and forth by the endless chain 27. It will be understood that the pin, designated 27', on the chain 27 moves in slot 21' in the vertical member 21 as said chain moves around the sprockets 28— 28' and thus operates to move said mist forming means back and forth as said endless chain is driven by the motor 32, shown in Fig. 3.

Thus I have provided an improved apparatus for producing a very fine mist for keeping fruits, vegetables, flowers and the like which are on display in a fresh and attractive condition. This mist, by actual demonstration is so fine as to barely be visible to the eye, but by placing a glass thereunder, it is easy to detect that such fine mist is present and is moving down upon the matter on display in the display racks or baskets. This makes it possible for the attendant to pick up the produce from such display stand without becoming noticeably wet, as would be the case were a spray of the usual character used instead of my improved mist producing apparatus.

The control of the water supply to the bowl 42 can be regulated or controlled by seeing to it that the usual faucet is adjusted to the right position to permit the slow feed of water to the bowl, as by dropping. The fact that the end only of the conical member 41 dips into said water also contributes to the efficiency of the apparatus and the control or regulation of the water moving up on the surface of said conical member.

While I have shown and described one practical embodiment of my invention, I am aware that changes in the details of construction and arrangement can be made without departing from the spirit of my invention, and I do not, therefore, limit the invention to the details used to illustrate the principle thereof, except as I may be limited by the hereto appended claims.

I claim:

1. A display stand for fruits, vegetables, flowers and the like, a mist forming device above said stand, said device including a water container, a member revolubly dipping into said water and operable at high speed to carry a film of water upwardly on its revolving surface, baffle means surrounding the upper end of said member for breaking up said film of water as thrown thereagainst from said revoluble member, a hood over said baffle means, means for producing an air current downwardly around said baffle means and under said hood to carry said mist on to matter on said stand, said mist and air current being regulable to approximate the rate of natural evaporation of moisture from the surface of the products on said stand.

2. A display stand and humidifier for perishable products including a stand for products, a humidifier movably supported over said stand, means for moving said humidifier back and forth over said stand, said humidifier consisting of a motor, a fan and a conical member in axial alinement, said fan and conical member being driven by said motor, a bowl for holding water and into which the small end of said conical member extends to carry water up the surface thereof as said member is driven at high speed, a hood over and around said fan and bowl and opening downwardly, the upper end of said conical member being designed to direct said water in the form of a fine mist outwardly therefrom under said hood into a down moving current of air from said fan on to products on said stand.

3. In a display stand of the character referred to a mist forming device supported over said stand, a motor driven element of conical form, a receptacle for water into which said element extends, means for controlling the supply of water to said receptacle to maintain a water level around the small end of said conical member, whereby to regulate the amount of water moving up the surface of said member, to be discharged therefrom, at its upper larger end, angular, spaced baffle members surrounding the upper end of said member and against and through which said water is discharged to convert it into a mist, a hood over said baffle member, open in its under side, and means for forcing a current of air downwardly around said baffle members under said hood, to carry said mist on to said display stand.

4. In a display stand for perishable products, a mist forming device supported over said stand, said device including a controllable water feed and a controllable air current, and means for converting the water into a fine mist, as distinguished from a spray, as it mingles with the air current, a hood over said means, and means around the open lower side of said hood for gathering water of condensation in said device and returning it to water feeding position, whereby to prevent dripping of water in drops on to said stand.

5. In combination, a display stand for produce, with a support thereabove, a humidifier carried by said support for forming a fine mist and directing it downwardly over a display stand, said humidifier including a motor, a fan and a conical member in axial alinement with said motor and driven thereby at a high speed, a bowl for water, supported under said conical member and into which the small end of said conical member extends, a series of angularly positioned baffle members around the upper end of said conical member and the upper edge of said bowl, whereby the film of water carried up the surface of said conical member is forced outwardly against and through said baffle members, for reducing it to a fine mist, means for maintaining a low level of water in said bowl around the small end of said conical member, and a hood around said fan, said baffle members and said bowl, and opening downwardly, whereby an air current from said fan above said baffle members is directed downwardly within said hood to carry said mist downwardly upon said display stand.

6. In combination, a display stand for produce, with a support thereabove, a humidifier carried by said support for forming a fine mist and directing it downwardly over a display stand, said humidifier including a movable support, a motor carried thereby, a fan and a conical member in axial alinement supported and driven by said motor at a high speed, a bowl into which said conical member extends, means for maintaining a low water level in said bowl around the small end of said conical member, a series of angularly positioned baffle members around the upper end of said conical member and through and against which said conical member discharges from its upper end a film of water moving up on its surface to break it up into a fine mist, a hood over and around said fan, said baffle members and said bowl, and against the inside of which an air current from said fan and the mist discharged through said baffle members, collide and are discharged downwardly from under said hood.

WINFRED P. SHEPHERD.